United States Patent [19]

Kikuchi et al.

[11] Patent Number: 5,129,476
[45] Date of Patent: Jul. 14, 1992

[54] FOUR-WHEEL-DRIVE MOTOR VEHICLE OF TRANSVERSELY-DISPOSED ENGINE TYPE

[75] Inventors: Reiji Kikuchi; Naomune Moriyama; Mitsuji Echigo, both of Yokohama; Masaya Watanabe, Tokyo; Hisaaki Katsuka, Hiroshima, all of Japan

[73] Assignee: Mazda Motor Corporation, Hiroshima, Japan

[21] Appl. No.: 530,581

[22] Filed: May 30, 1990

[30] Foreign Application Priority Data

May 31, 1989 [JP] Japan .................. 1-139769

[51] Int. Cl.⁵ .......................... B60K 17/358
[52] U.S. Cl. ...................... 180/234; 180/297; 180/309; 180/79.3
[58] Field of Search ............... 180/297, 248, 249, 148, 180/163, 79.3, 234, 309, 240

[56] References Cited

U.S. PATENT DOCUMENTS

| | | | |
|---|---|---|---|
| 783,547 | 2/1905 | Schmidt | 180/297 |
| 3,476,200 | 11/1969 | Schoepe et al. | 180/248 |
| 4,601,359 | 7/1986 | Weismann et al. | 180/248 X |
| 4,716,984 | 1/1988 | Hiramatsu et al. | 180/297 |

FOREIGN PATENT DOCUMENTS

| | | |
|---|---|---|
| 0337740 | 10/1989 | European Pat. Off. ............ 180/297 |
| 60-179333 | 9/1985 | Japan . |
| 60-179334 | 9/1985 | Japan . |
| 60-179335 | 9/1985 | Japan . |
| 63-103735 | 5/1988 | Japan . |
| 63-103736 | 5/1988 | Japan . |
| 63-103737 | 5/1988 | Japan . |
| 63-23219 | 6/1988 | Japan . |

*Primary Examiner*—Andres Kashnikow
*Assistant Examiner*—Brian L. Johnson
*Attorney, Agent, or Firm*—Sixbey, Friedman, Leedom & Ferguson

[57] ABSTRACT

In the case where a steering shaft and an exhaust pipe are arranged in the longitudinal direction of vehicle body across a front axle in the four-wheel-drive motor vehicle of transversely-disposed engine type, such are arranged by utilizing a dead space between a front differential and a directional change gear. This arrangement can meet the required road clearance and other requirements, while preventing interference with differential, etc.

12 Claims, 8 Drawing Sheets

FOUR-WHEEL-DRIVE MOTOR VEHICLE OF TRANSVERSELY-DISPOSED ENGINE TYPE

BACKGROUND OF THE INVENTION

1. Field of the Invention

This invention relates to a four-wheel-drive motor vehicle of transversely-disposed engine type, in which a front differential and a directional change gear for transmitting driving force to rear wheels are disposed coaxially with a certain space left therebetween, especially to a layout of members which extend in the longitudinal direction of a vehicle body below the axle.

2. Description of the Prior Art

For example, Japanese Patent Application Laying Open Gazette No. 63-103735 discloses a new layout of the engine, power transmitting system, etc. in relation to axles for a transversely-disposed engine. According to this layout, an engine is disposed above and in the rear of a front axle where a front differential is arranged, a transmission is connected to the engine through the medium of an intermediate gear or the like and a steering mechanism is arranged below the engine which is in the rear of the axle. As compared with the case where the greater part of the engine and the power transmitting mechanism is located in front of the axle, the above layout lightens the load on front wheels and as a result improves revolvability, steerability, etc. of a motor vehicle.

In the above mechanism, a directional change gear for power transmitting to the rear wheel side in the case of four-wheel-driving is provided on a different axis from the front differential but it is also known that mainly for the purpose of compactness, the front differential and the directional change gear are arranged coaxially on the front axle, with a certain space left therebetween.

In the construction disclosed by the above gazette, a steering mechanism is arranged in the rear of the axle but in the case where an engine is located in the rear of the axle, it is advantageous to arrange the steering mechanism in front of the axle for locating the steering mechanism as near the axle as possible, while preventing interference with an oil pan at a lower end of the engine and ensuring the required road clearance.

In the above case, however, it is required to arrange a steering shaft connected to the steering mechanism in such a fashion that it extends is the longitudinal direction across the axle. Therefore, in laying out it is required to prevent interference with a differential, etc. Also, if the steering shaft is located lower than the differential, etc., the road clearance is reduced and this is undesirable for running of a vehicle. Moreover, if the position of the steering shaft in the direction of vehicle width is excessively deflected to the side away from the central part, such position is undesirable from the aspect of transmittability of steering force, etc.

In the case where a V-type engine is disposed transversely, for example, an exhaust pipe which introduces exhaust from a bank in front of the engine is arranged in such a fashion that it extends rearwardly across the axle from the front of the axle. In such layout of the exhaust pipe, it is required to prevent interference with the differential, etc. and to ensure the required ground clearance. Also, since it is advantageous to locate the exhaust pipe as near the center of vehicle width direction as possible for leading out exhaust, the same problem as in the case of arranging the steering shaft across the axle will arise.

SUMMARY OF THE INVENTION

An object of the present invention is to provide a four-wheel-drive motor vehicle of transversely-disposed engine type for which such effective layout as meeting the requirements of ensuring the required road clearance, etc., while preventing interference with the differential and others, can be drawn in arranging the steering shaft and the exhaust pipe in the longitudinal direction across the axle.

In order to attain the above object, the first invention is that in the four-wheel-drive motor vehicle of transversely-disposed engine type, a front differential and a directional change gear for transmitting driving force to rear wheels are arranged coaxially with a certain space left therebetween, a steering mechanism is arranged in the forward direction of the vehicle body from the front axle and a steering shaft which is connected to the steering mechanism and extends in the longitudinal direction of the vehicle body is arranged below the axle between the front differential and the directional change gear.

Under the above composition, the steering shaft can be laid out properly at the height of the required road clearance, while preventing interference with the differential, etc., and at the position near the directional change gear by utilizing a dead space between the front differential and the directional change gear.

The second invention is that in the four-wheel-drive motor vehicle of transversely-disposed engine type, a front differential and a directional change gear for transmitting driving force to rear wheels are arranged coaxially with a certain space left therebetween, and an exhaust pipe of the engine which extends below the axle in the gear direction of the vehicle body from the front of the axle is arranged between the front differential and the directional change gear.

Under the above composition, the exhaust pipe can be laid out properly as in the case of the steering shaft in the first invention.

The third invention provides the composition in which the steering shaft is connected to the steering mechanism in front of the axle and extends in the longitudinal direction of the vehicle body, the exhaust pipe extends below the axle in the longitudinal direction of the vehicle body from the front of the axle and at least one of the steering shaft and the exhaust pipe is arranged between the front differential and the directional change gear.

Under the above composition, even in the case where both the steering shaft and the exhaust pipe are arranged in such a fashion that both cross the axle, at least one of them can be laid out properly by utilizing a dead space between the front differential and the directional change gear.

The fourth invention is to arrange the steering shaft and the exhaust pipe in such a fashion that both pass below the axle at the side opposite to the front differential side in relation to the directional change gear.

Under the above composition, both the steering shaft and the exhaust pipe can be laid out properly at the height of the required road cleanance, while preventing interference with the differential, etc., and at the position near the directional change gear.

The above and other objects, features and advantage of the present invention will be understood more clearly by reading the following description of the preferred embodiments with reference to the accompanying drawings.

BRIEF DESCRIPTION OF THE DRAWINGS

The attached drawings show preferred embodiments of the present invention, in which:

FIG. 1 to FIG. 3 show the first embodiment, in which

FIG. 6 and FIG. 7 show the second embodiment, in which

FIG. 8 and FIG. 9 show the third embodiment, in which

FIG. 10 to FIG. 12 show the fourth embodiment of the present invention, in which

FIG. 13 to FIG. 15 show the fifth embodiment of the present invention, in which

In each FIG. 1, FIG. 6, FIG. 8, FIG. 10 and FIG. 13, the underside of the figure is on the front side of the vehicle body. In each of FIG. 3, FIG. 12 and FIG. 15, the left side of the figure is on the front side of the vehicle body. Each of FIG. 2, FIG. 7, FIG. 9, FIG. 11 and FIG. 14 shows the engine, driving system, etc. as viewed from the front of the vehicle body.

DETAILED DESCRIPTION OF PREFERRED EMBODIMENTS

Figure 1:
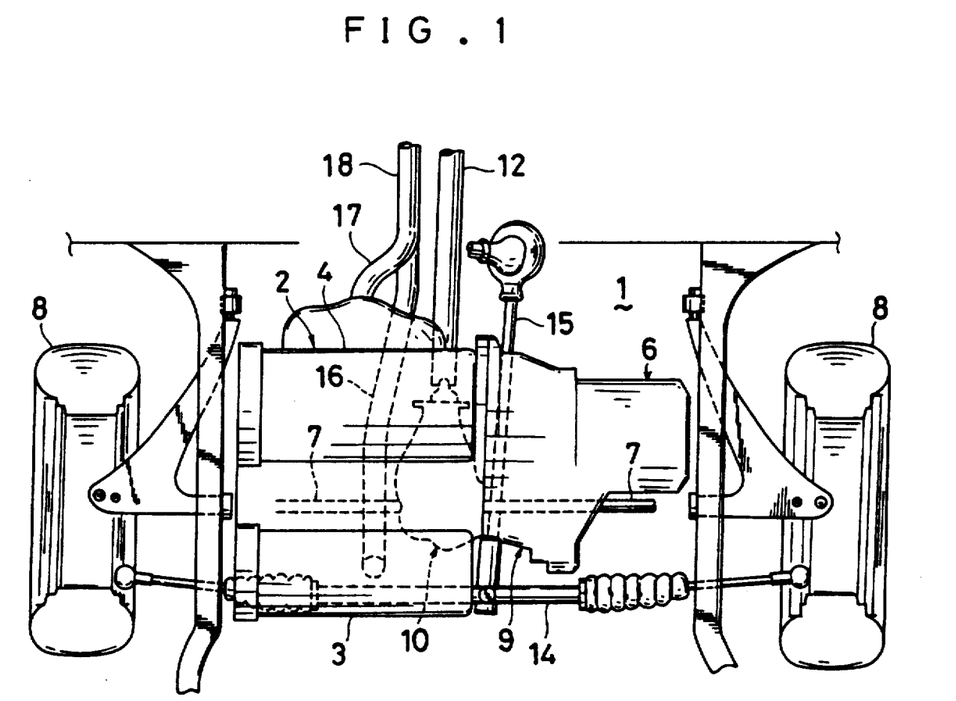
FIG. 1 is a plan view.
Figure 2:
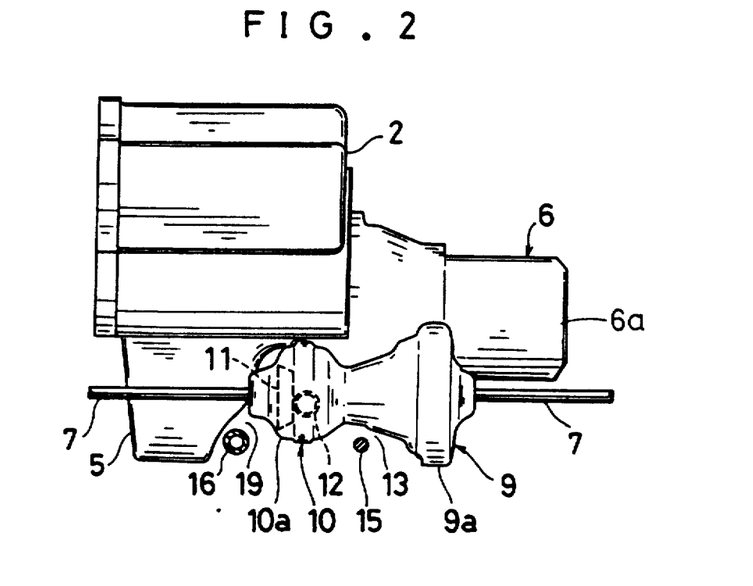
FIG. 2 is a front view of a main part, partly broken down.
Figure 3:
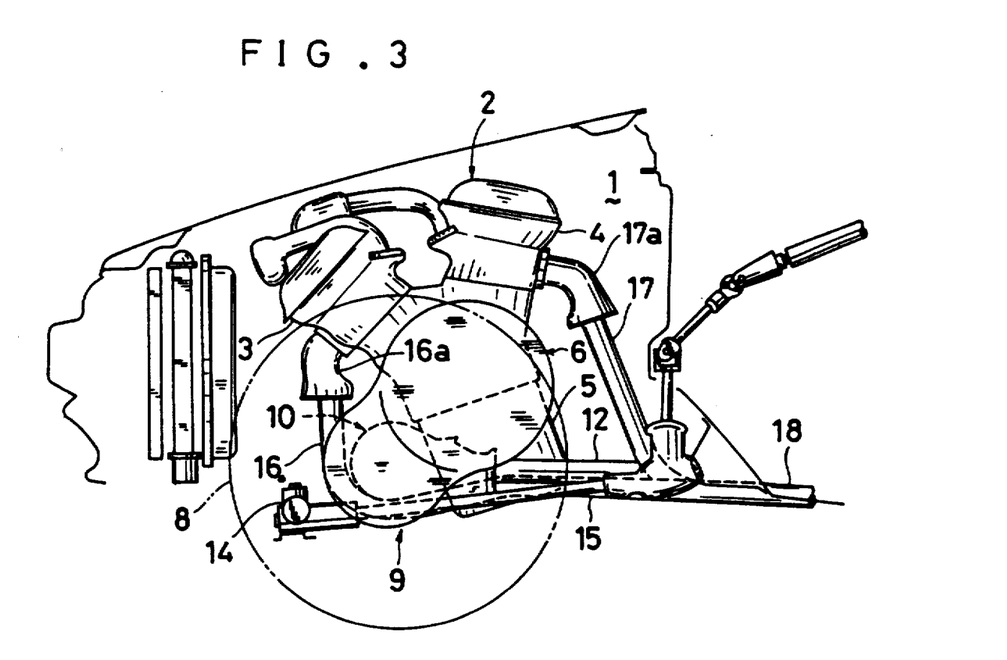
FIG. 3 is a side view.

FIG. 1 to FIG. 3 show the first embodiment of the present invention. Reference numeral 1 designates an engine room at the front of the vehicle body and reference numeral 2 designates an engine disposed in the engine room. The engine 2 is disposed transversely in relation to the vehicle body, namely, in such a fashion that an output shaft of the engine extends in the direction of vehicle width. The engine 2 shown in the drawing is of V-type having a pair of banks 3, 4, front and rear, and is arranged in the state of slightly inclined in the front direction. An oil pan 5 is fitted to the lower end portion of the engine 2. A transmission 6 with transmitting mechanism in a transmission case 6a is connected to the engine 2. In the example shown in the drawing, the engine is located on the right side as seen from a driver's seat (left side in FIG. 1 and FIG. 3) and the transmission 6 is located on the left side as seen from the driver's seat. The transmission 6 is connected to the engine 2 in series.

Reference numeral 7 designates a pair of front axles connected to each front wheel 8, right and left, and extending in the direction of vehicle width below the engine room 1. The engine 2 and the transmission 6 are arranged in such a fashion that the greater part thereof is located in the rear direction from right above the axle 7. Such arrangement is intended to mitigate the load on front wheels and to improve motive function, steerability, etc. at revolving of the vehicle body.

A front differential 9 and a center differential 10 are arranged coaxially on the axle 7, with a certain space left therebetween. A directional change gear 11 for transmitting driving force to rear wheels is incorporated in the center differential 10 and a propeller shaft 12 which is connected to the gear 11 for power transmitting extends in the rear direction of vehicle body. The propeller shaft 12 is arranged in such a fashion that it passes substantially the center of width direction of the vehicle body so that driving power can be transmitted well to the rear wheel side. Therefore, the center differential 10, in which the directional change gear 11 connected with the propeller shaft 12 incorporated, is also located substantially the center of width direction of the vehicle body and the front differential 9 is located below and in front of the transmission 6 at the side of the center differential 10.

A housing 9a of the front differential 9 which is connected to the transmission case 6a projects below and in front of the latter. A housing 10a of the center differential 10 is connected to the side of the housings 9a. The axle 7 passes through the housing 9a and 10a. Between the front differential 9 and the center differential 10 (namely, at about the connecting part of the housings 9a and 10a), both housings 9a, 10a are formed in such a shape that each contracts toward the axle 7 and thereby form a space 13 or a dead space below the axle 7.

Reference numeral 14 designates a steering mechanism. As the greater part of the engine 2 and the transmission 6 is located in the rear direction from the axle 7, the steering mechanism is arranged in front of the axle 7 so that it is located near the axle 7, while preventing interference with the oil pan 5, etc. of the engine 2. A steering shaft 15 which is connected at its forward end to the steering mechanism 14 extends in the longitudinal direction of vehicle body, below the axle 7 and its rear end is connected to a steering wheel (not shown in the drawing) through the medium of a joint or the like.

A front exhaust pipe 16 and a rear exhaust pipe 17 are connected to the front surface of the front bank 3 of the engine 2 and to the rear surface of the rear bank 4 respectively, through the medium of exhaust manifolds 16a and 17a. The front exhaust pipe 16 extends to the rear side of the vehicle body, passing below the axle 7 from the front of the axle 7 and is combined with the rear exhaust pipe 17 at the rear of the axle 7. A common exhaust pipe 18 downstream from the combined part extends to a rear end of the vehicle body.

The steering shaft 15 and the front exhaust pipe 16 are arranged as described below.

The steering shaft 15 is so arranged that it passes the space 13 below the axle 7 between the front differential 9 and the directional change gear 11 or between the front differential 9 and the center differential 10 (in the case where the directional change gear 11 is incorporated in the center differential 10). The front exhaust pipe is so arranged that it passes through a space 19 which exists below the axle 7 at the side opposite to the front differential 9 in relation to the directional change gear 11 (center differential 10), namely, at the side where the engine 2 is located.

According to the first embodiment, the steering shaft is arranged in the space 13 between the front differential 9 and the center differential 10 (such space has so far been left to no purpose as a dead space). Under this arrangement, the steering shaft 15 is positioned higher than in the case where it is arranged below the front differential 9, etc., while preventing interference with the front differential 9 and the center differential 10, and thus sufficient road clearance is ensured. Moreover, since the steering shaft 15 passes the position near the center of vehicle width direction, close to the propeller shaft 12, transmitting of steering force is improved. Also, arrangement of the front exhaust pipe 16 at the space 19 below the axle 7 at the side of the engine 2 side in relation to the center differential 10 makes it possible for the front exhaust pipe 16 to prevent interference with the front differential 9 and the center differential 10 and to pass the position near the center of vehicle width direction, close to the propeller shaft 12, at the height of the sufficient road clearance.

Figure 4:
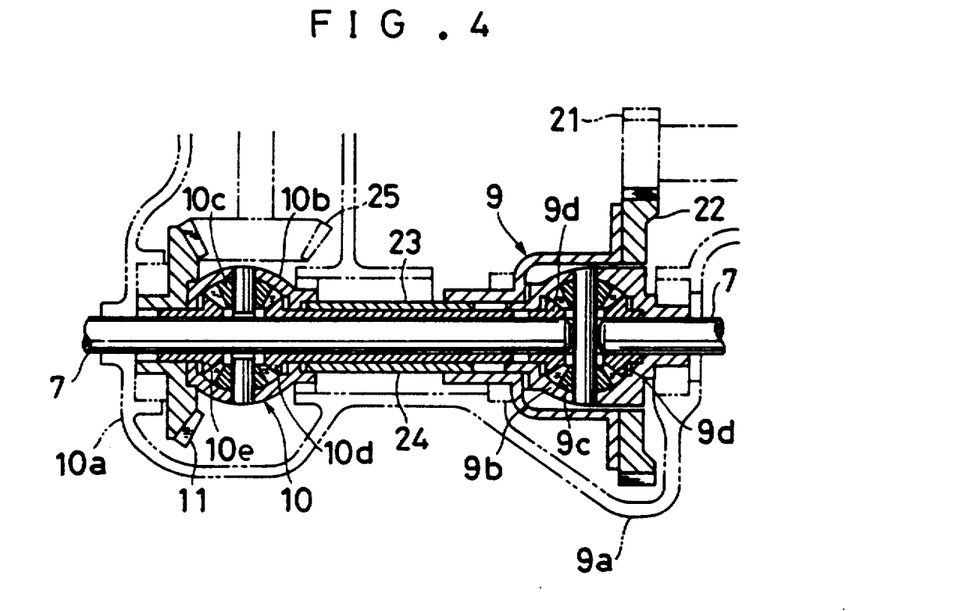
FIG. 4 and FIG. 5 are cross sectional views, each showing an example of the concrete construction of the power transmitting system.

FIG. 4 shows an example of a concrete construction of the front differential 9 and the center differential 10 arranged coaxially on the axle 7. In this figure, a differential case 9b, a pinion gear 9c and the front differential 9 having a pair of (right and left) side gears 9d are arranged inside a gear ring 22 which meshes with an output gear 21 of the transmission 6. Each axle 7 (right and left) is connected to respective side gear 9d of the front differential 9. Provided around the axle 7 at the side of the front differential 9 are a differential case 10b, a pinion gear 10c and the center differential 10 having a pair of (right and left) side gears 10d, 10e. The differential case 10b of the center differential 10 is connected to the gear ring 22 through the medium of a tubular connecting member 23. The differential case 9b of the front differential 9 is connected to the side gear 10d of the center differential 10 through the medium of a hollow shaft 24 and the directional change gear 11 located at the outer circumference of the center differential 10 is connected to the other side gears 10d of the center differential 10. The directional change gear 11 comprises a bevel gear, and a gear 25 which meshes with the gear 11 is connected to a front end of the propeller shaft 12. Under the above construction the front differential 9 and the center differential 10 in which the directional change gear 11 is incorporated are arranged coaxially on the axle 7 with a certain space left therebetween.

Figure 5:
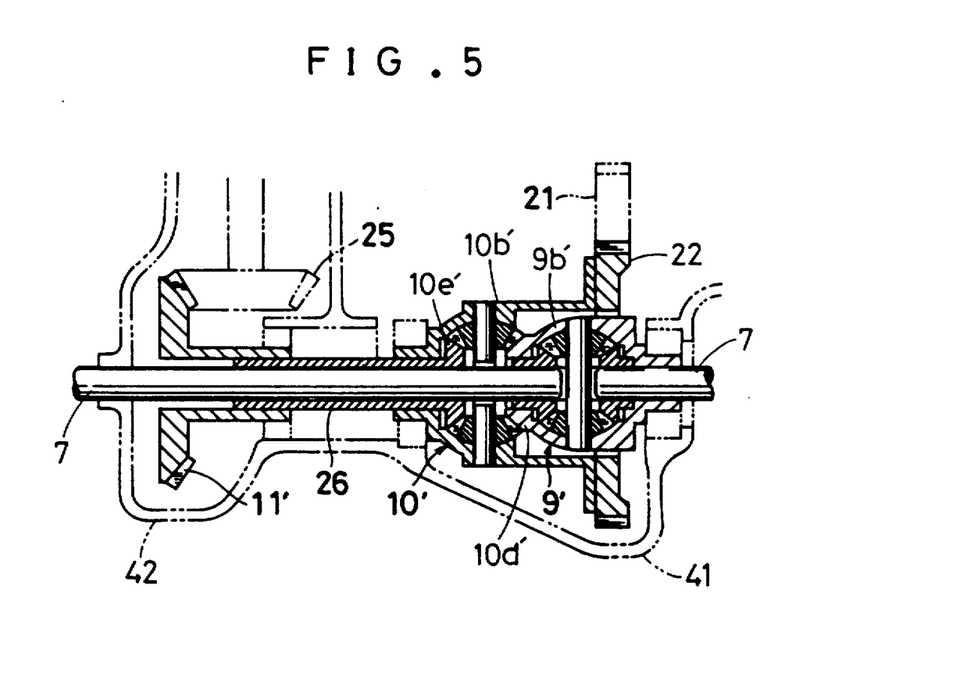

The concrete construction of a power transmission system is not limited to the above example and such construction as shown in FIG. 5 can be adopted. In FIG. 5, a front differential 9' and a center differential 10' are arranged near the axle 7 inside the ring gear 22 and a directional change gear 11' is arranged around the axle 7 at the position a certain space apart from them. The ring gear 22 is connected to a differential case 10b' of the center differential 10'. A differential case 9b' of the front differential 9' is connected to a side gear 10d' of the center differential 10'. The directional change gear 11' is connected to the other side gear 10e' of the center differential 10' through the medium of a hollow connecting member 26. The front differential 9' and the center differential 10' are accommodated in a housing 41 which is connected to another housing 42 in which the directional change gear 11' is accommodated. While the axle 7 passes through both housings 41, 42, both housings are shaped in such a fashion that they get narrow at about their connecting part, namely, contract toward the axle 7 at the connecting part.

In the case of the above construction, the front differential 9' and the center differential 10' are arranged at the position where the front differential 9 is located in FIG. 1 or FIG. 3 and the directional change gear 11' is arranged at the position which corresponds to the position where the center differential 10 is located in FIG. 1 or FIG. 3. In this case, too, the steering shaft 15, the front exhaust pipe 16, etc. may be arranged as shown in FIG. 1 or FIG. 3.

In the part-time four-wheel-drive motor vehicle, a center differential can be omitted but even in such case a front differential and a directional change gear can be arranged coaxially on the axle with a certain space left therebetween and the steering shaft 15, the front exhaust pipe 16, etc. can be arranged as shown in FIG. 1 or FIG. 3.

In the second, third, fourth embodiment to be described later, the center differential 10 and the directional change gear 11 are arranged in such a fashion as shown by FIG. 4 but can be arranged as shown by FIG. 5 or such arrangement as omitting the center differential can be adopted.

Figure 6:
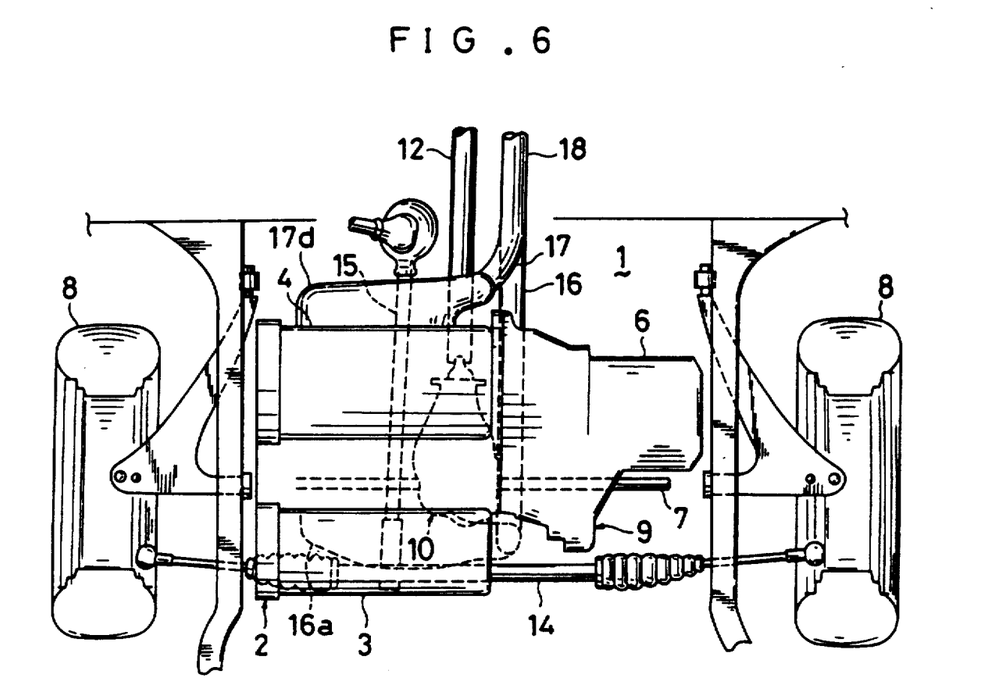
FIG. 6 is a plan view and FIG. 7 is a front view of a main part, partly broken down.
Figure 7:
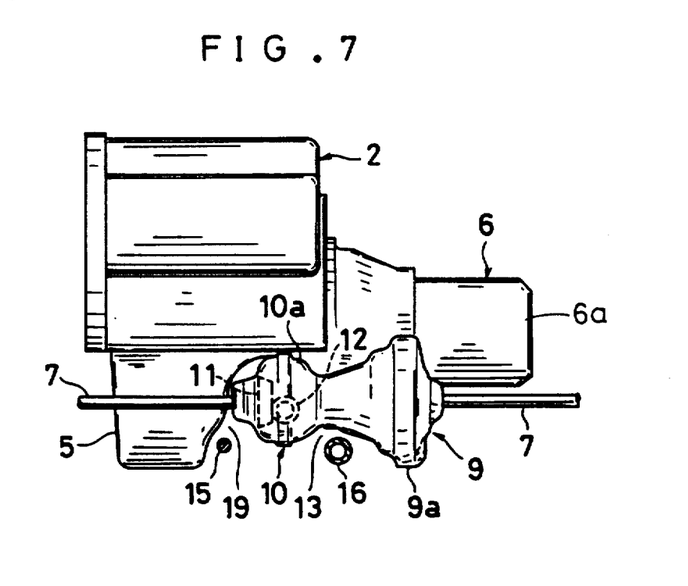

FIG. 6 and FIG. 7 show the second embodiment. In this embodiment, the positional relation between the steering shaft 15 and the front exhaust pipe 16 is contrary to that in the first embodiment, namely, while the front exhaust pipe 16 is arranged at the position where it passes a space 13 below the axle 7 between the front differential 9 and the center differential 10, the steering shaft 15 is arranged at the position where it passes a space 19 which is below the axle 7 and at the side of the engine 2 side in relation to the center differential 10 in which the directional change gear 11 is incorporated. Construction and arrangement of the other parts are the same in the case of the first embodiment.

In the second embodiment, too, the front exhaust pipe 16 and the steering shaft 15 are arranged by utilizing the space 13 below the axle 7 between the front differential 9 and the center differential 10 and the space 19 below the axle 7 at the side of the engine 2 side in relation to the center differential 10. Thus, the second embodiment displays the same action and the same effect as in the case of the first embodiment.

For example, in the case of a vehicle motor of right-handed handle where the steering shaft 15 should better be located slightly toward the side of the engine 2 side from the center of vehicle width direction (for the convenience of connection with the steering wheel), a layout of the second embodiment is preferable. Also, in the case where the exhaust pipe should be located slightly toward the side of the engine 2 side from the center of vehicle width direction (for preventing interference with a fuel tank, etc), a layout of the first embodiment is preferable.

In the first and the second embodiments (and the third-fifth embodiments to be described later), both the steering shaft 15 and the front exhaust pipe 16 pass below the axle 7 but in such case where the exhaust pipe is not required to cross the axle 7 (according to the construction of the engine, etc.), it is suggested to pass only the steering shaft 15 below the axle 7 under the arrangement shown in FIG. 1–FIG. 3. Also, in the case where the front exhaust pipe 16 crosses the axle 7 but the steering shaft is not required to cross the axle 7 (in such case where the steering mechanism is located in the rear direction from the axle), it is suggested to pass only the front exhaust pipe 16 below the axle 7 under the arrangement shown in FIG. 6 and FIG. 7.

Figure 8:
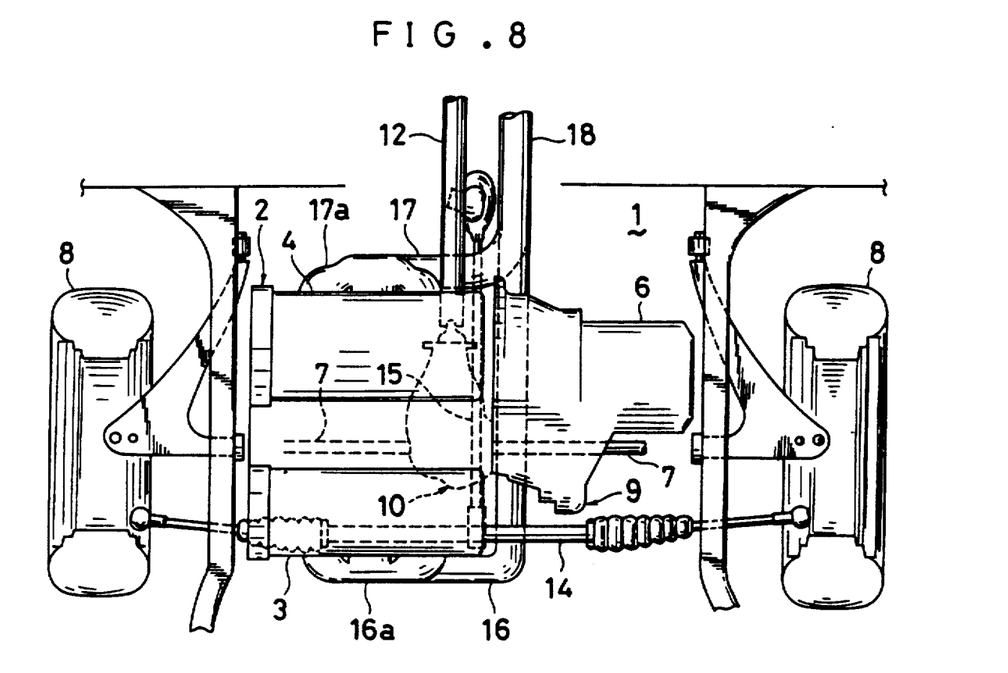
FIG. 8 is a plan view and FIG. 9 is a front view of a main part, partly broken down.
Figure 9:
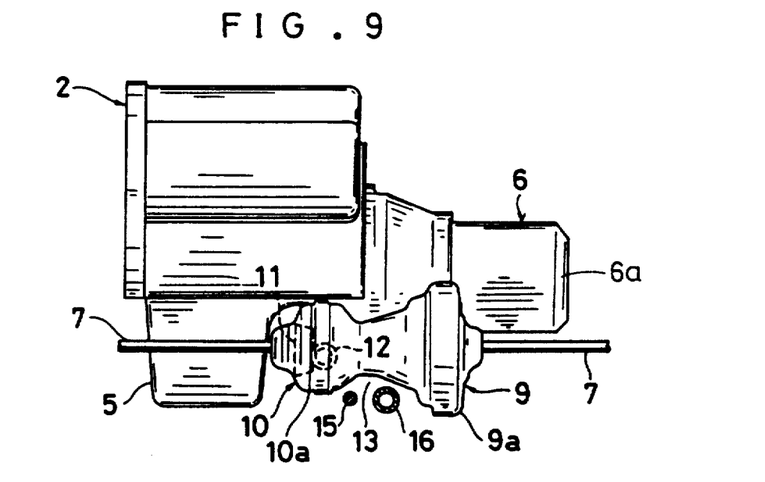

FIG. 8 and FIG. 9 show the third embodiment. In this embodiment, both the steering shaft 15 and the front exhaust pipe 16 are arranged, close to each other, at the position where both pass the space 13 below the axle 7 between the front differential 9 and the center differential 10. The positional relation between the steering shaft 15 and the front exhaust pipe 16 can be contrary to that shown in FIG. 8 and FIG. 9. Construction and arrangement of the other parts are the same as those in the first embodiment.

In this embodiment, too, the steering shaft 15 and the front exhaust pipe 16 are laid out in such a fashion that they pass at the position close to the center of vehicle width direction and at the height of the required road clearance, free from interference with the front differential 9, the center differential 10, etc. Especially in this embodiment, since neither the steering shaft 15 nor the front exhaust pipe 16 are located at the side of the engine 2 side from the center differential 10, this embodiment has such advantage that the size of the oil pan 5 is not restricted.

Figure 10:
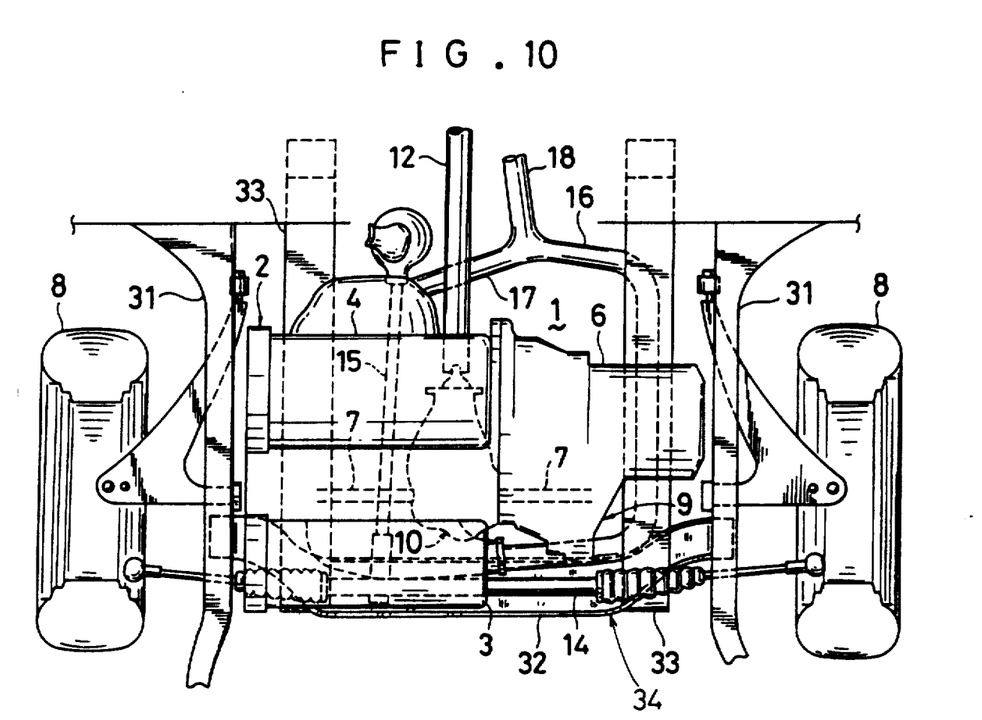
FIG. 10 is plan view.
Figure 11:
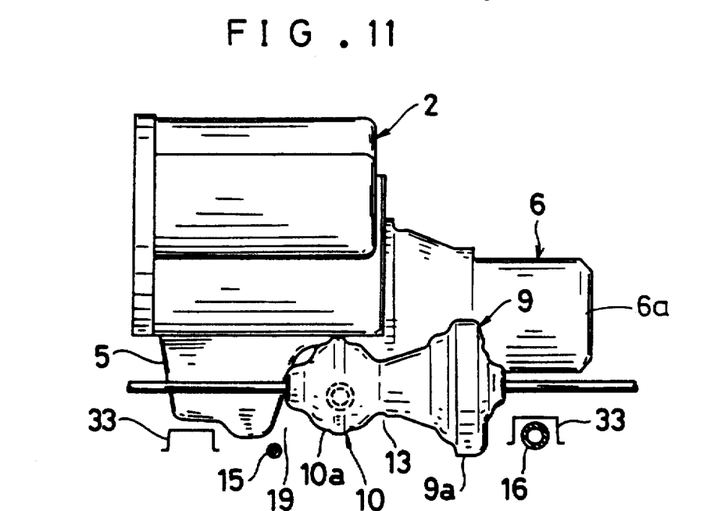
FIG. 11 is a front view of a main part, partly broken down.
Figure 12:
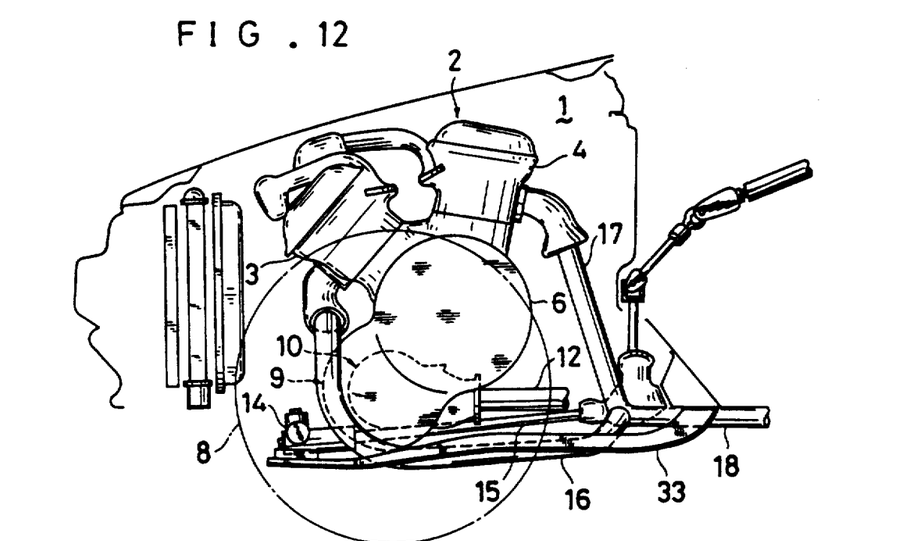
FIG. 12 is a side view.

FIG. 10-FIG. 12 show the fourth embodiment. In these figures, a cross member 32 on which a steering mechanism is mounted and a subframe 34 comprising a pair of (right and left) vertical member 33 are arranged between frames 31 on both sides of the vehicle motor. Each vertical member 33 of the subframe 34 passes below the axle 7 and the front exhaust pipe 16 is arranged by utilizing the vertical member 33, namely, the front exhaust pipe 16 is arranged in such a fashion that is extends rearwardly, passing the inside of the vertical member 33 which is located at the side of the front differential 9. On the other hand, the steering shaft 15 is arranged at the position where it passes the space 19 below the axle 7 at the side of the engine 2 side in relation to the center differential 10 in which the directional change gear 11 is incorporated. The steering shaft 15 can be arranged at the position where it passes the space 13 below the axle 7 between the front differential 9 and the center differential 10. Construction and arrangement of the other parts are the same in the case of the first embodiment.

According to the arrangement of the front exhaust pipe 16 and the steering shaft 15 as in the case of this embodiment, such effects as preventing interference with the front differential 9, the center differential 10, etc., securing the required road clearance and preventing thermal pollution (heat radiated from the exhaust pipe is intercepted by the vertical member 33 of the subframe 34) can be obtained.

Figure 13:
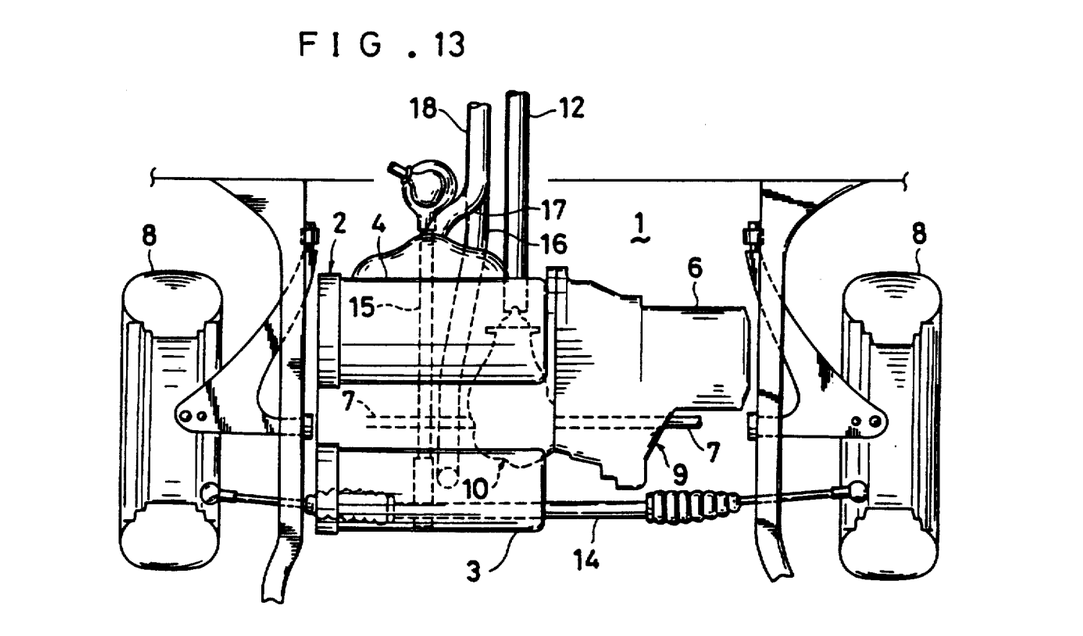
FIG. 13 is a plan view.
Figure 14:
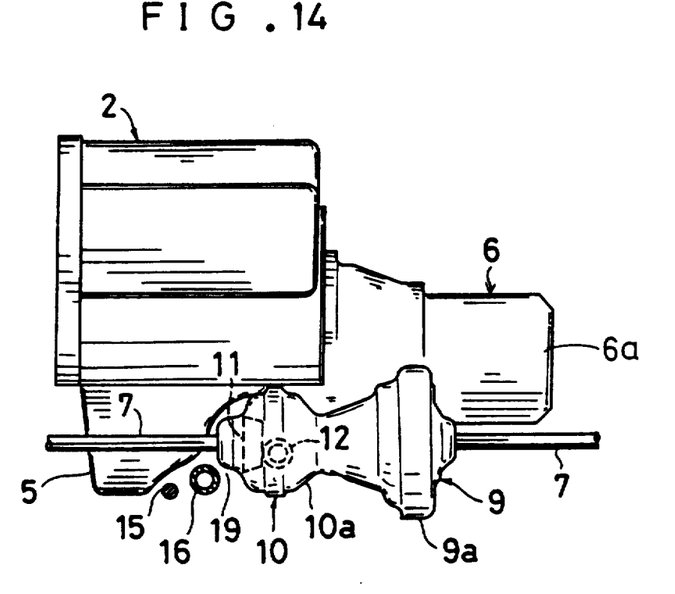
FIG. 14 is a front view of a main part, partly broken down.
Figure 15:
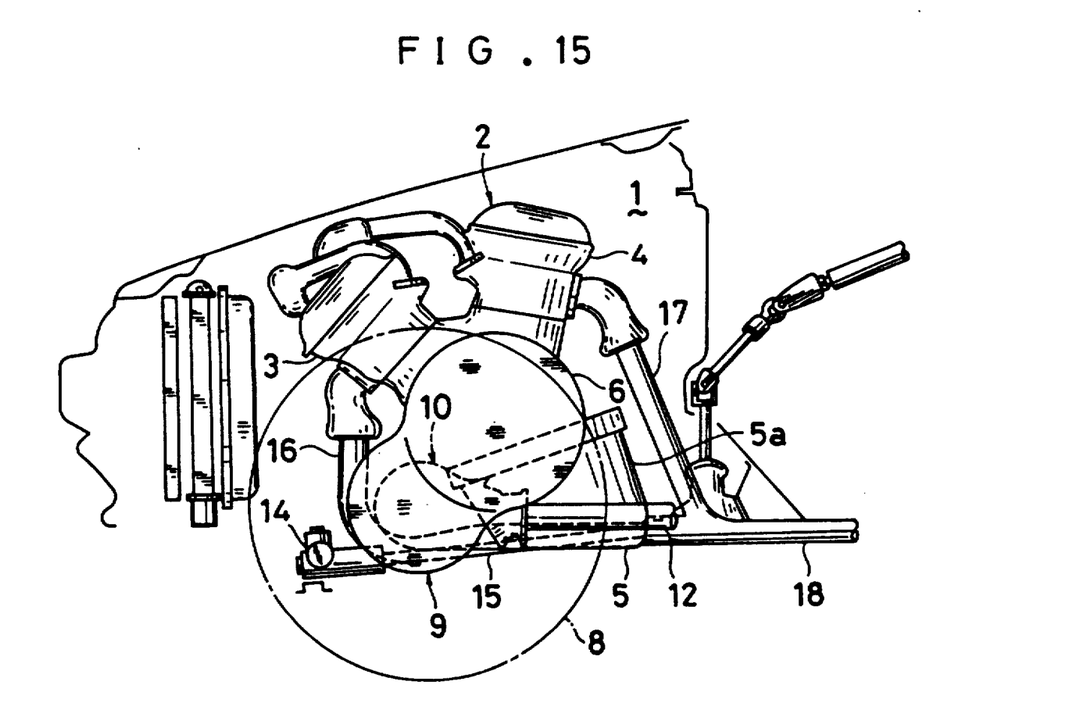
FIG. 15 is a side view.

FIG. 13 to FIG. 15 show the fifth embodiment. In the embodiment, both the steering shaft 15 and the front exhaust pipe 16 are arranged, close to each other, at the position where both pass the space 19 below the axle 7 at the side contrary to the front differential 9 in relation to the center differential 10. The positional relation between the steering shaft 15 and the front exhaust pipe 16 can be contrary to that shown in the drawing. Construction and arrangement of the other parts are the same as in the case of the first embodiment.

The layout of this embodiment can be adopted in the case where the steering shaft 15 and the steering wheel are connected as mentioned above and the case where both the steering shaft 15 and the front exhaust pipe 16 should better be located slightly toward the side of the engine 2 from the center of vehicle width direction (for preventing interference with the exhaust pipe, the fuel tank, etc.). According to this embodiment, too, the steering shaft 15 and the front exhaust pipe 16 are arranged effectively for preventing interference with the front differential 9, the center differential 10, etc. and for securing the required road clearance.

However, according to this embodiment, since both the steering shaft 15 and the front exhaust pipe 16 are located at the side of the engine 2 side from the center differential 10, the oil pan 5 to be fitted below the engine 2 is restricted in its size in vehicle width direction so as to prevent interference with the steering shaft 15 and the front exhaust pipe 16. Therefore, as shown in FIG. 15 it is suggested to form the oil pan 5 in such a shape that its rear part projects in the rear direction from the engine 2 so as to secure the capacity of the oil pan 5 by such projected part 5a.

What is claimed is:

1. A four-wheel drive motor vehicle of transversely-disposed engine type comprising a body, a front axle extending in the direction of vehicle width for transferring engine output to front wheels, the front axle positioned forward of horizontally adjacent portions of the engine, a front differential and a directional change gear for transmitting driving force to rear wheels arranged coaxially on a front axle and include a portion spaced a predetermined distance from one another, a steering mechanism arranged on the vehicle body forwardly from the front axle and extending in the direction of vehicle width, and a steering shaft connected to said steering mechanism and extending in the longitudinal direction of vehicle body, the steering shaft arranged below the engine and disposed at a position where it passes below the front axle and between the front differential and the directional change gear predetermined spaced portion.

2. A four-wheel-drive motor vehicle of transversely-disposed engine type as defined in claim 1, further comprising a center differential which permits differential between front wheels and rear wheels and is arranged on the front axle.

3. A four-wheel-drive motor vehicle of transversely-disposed engine type as defined in claim 2, wherein the center differential is arranged on the front axle with a predetermined distance left from the front differential and incorporates therein the directional change gear.

4. A four-wheel-drive motor vehicle of transversely-disposed engine type as defined in claim 2, wherein the center differential is arranged near the front differential on the front axle and the directional change gear is arranged around the front axle, predetermined distance with a left from both differentials.

5. A four-wheel-drive motor vehicle of transversely-disposed engine as defined in claim 4, wherein a housing of the front differential and a housing accommodating the directional change gear therein are connected to each other, the front axle is passed through both said housings, both said housings narrow toward the axle at the connection so as to form a space below the axle and the steering shaft is so arranged as to pass through said space.

6. A four-wheel-drive motor vehicle of transversely-disposed engine type as defined in claim 3, wherein the directional change gear comprises a bevel gear which meshes with another bevel gear provided at a forward end of a propeller shaft.

7. A four-wheel-drive motor vehicle of transversely-disposed engine type as defined in claim 5, wherein the directional change gear comprises a bevel gear which meshes with another bevel gear provided at a forward end of a propeller shift.

8. A four-wheel drive motor vehicle of transversely disposed engine type as defined in claim 2, further comprising an exhaust pipe of said engine extending from a front side of said front axle to a rear side of the vehicle body below said front axle, and an oil pan expanded downward and mounted below said engine, said exhaust pipe being arranged at a position to pass below said front axle between said oil pan and said center differential.

9. A four-wheel drive motor vehicle of transversely disposed engine type as defined in claim 2, wherein said engine is a V-type engine having a pair of banks in front and in rear, said front bank and said rear bank are connected with a front exhaust pipe and a rear exhaust pipe respectively through the medium of an exhaust manifold and said front exhaust pipe extends in a rear direction of the vehicle body, passing below the front axle between an oil pan and said center differential, from in front of the front axle and is combined with said rear exhaust pipe at a rear position of the axle.

10. A four-wheel drive motor vehicle of transversely-disposed engine type, in which an output shaft of the engine extends in the direction of vehicle width, the motor vehicle comprising:
- a front axle extending in the direction of vehicle width for transferring engine output to front wheels, the front axle positioned forward of horizontally adjacent portions of the engine,
- front differential gears disposed on the front axle,
- a directional change gear for transmitting driving force to rear wheels through a propeller shaft,
- the front differential gears and the directional change gear being disposed on the front axle and spaced a predetermined distance in the direction of vehicle width from one another,
- housing means for enclosing the front differential gears and the directional change gear, the housing means having a narrow portion so as to form a space below the front axle between the housing means and ground,
- a steering mechanism disposed in front of the front axle and extending in the direction of vehicle width, and
- a steering shaft for transferring steering operation by a vehicle driver to the steering mechanism, the steering shaft extending in the longitudinal direction of vehicle body below the engine and passing through said space formed by the housing means.

11. A four-wheel drive motor vehicle of transversely-disposed engine type as defined in claim 10 further comprising an exhaust pipe of said engine extending from a front side of said front axle to a rear side of the vehicle body below said front axle, and an oil pan expanded downward and mounted below said engine, said exhaust pipe being arranged at a position to pass below said front axle between said oil pan and said housing means.

12. A four-wheel drive motor vehicle of transversely-disposed engine type as defined in claim 10, wherein said engine is a V-type engine having a pair of banks in front and in rear, said front bank and said rear bank are connected with a front exhaust pipe and rear exhaust pipe respectively through the medium of an exhaust manifold and said front exhaust pipe extends in a rear direction of the vehicle body, passing below the front axle, from in front of the front axle and is combined with said rear exhaust pipe at a rear position of the axle.

* * * * *